United States Patent
Laitinen et al.

(10) Patent No.: US 8,059,428 B2
(45) Date of Patent: Nov. 15, 2011

(54) REACTOR ARRANGEMENT FOR ALTERNATING ELECTRICAL CURRENT

(75) Inventors: Matti Laitinen, Kirkkonummi (FI); Tero Tapani Viitanen, Vantaa (FI); Paulius Pieteris, Espoo (FI)

(73) Assignee: ABB Oy, Helsinki (FI)

( * ) Notice: Subject to any disclaimer, the term of this patent is extended or adjusted under 35 U.S.C. 154(b) by 197 days.

(21) Appl. No.: 12/403,787

(22) Filed: Mar. 13, 2009

(65) Prior Publication Data

US 2009/0231891 A1  Sep. 17, 2009

(30) Foreign Application Priority Data

Mar. 14, 2008 (EP) .................................... 08152727

(51) Int. Cl.
*H01F 38/04* (2006.01)
*H02M 1/12* (2006.01)
*G05F 5/06* (2006.01)

(52) U.S. Cl. .............................. 363/12; 363/44; 323/206
(58) Field of Classification Search .................. 336/110, 336/165
See application file for complete search history.

(56) References Cited

U.S. PATENT DOCUMENTS

| | | | |
|---|---|---|---|
| 2,636,158 A | | 4/1953 | Bedford |
| 2,765,436 A | | 10/1956 | Dornhoefer |
| 2,790,136 A | * | 4/1957 | Bennett et al. ................ 363/126 |
| 2,830,258 A | * | 4/1958 | Conrath ........................ 323/334 |
| 3,340,453 A | | 9/1967 | Bradley et al. |
| 3,444,450 A | * | 5/1969 | Koppelmann .................... 318/82 |
| 3,525,922 A | * | 8/1970 | Abbey ............................. 363/67 |
| T966,010 I4 | * | 1/1978 | Sweetana et al. ............. 323/356 |
| 4,155,034 A | * | 5/1979 | Logan ............................ 323/337 |
| 5,821,844 A | * | 10/1998 | Tominaga et al. ............. 336/110 |
| 7,132,812 B1 | * | 11/2006 | Wu et al. ........................ 318/448 |

FOREIGN PATENT DOCUMENTS

| | | |
|---|---|---|
| JP | 2006-319176 | 11/2006 |
| JP | 2006319176 A | * 11/2006 |

OTHER PUBLICATIONS

European Search Report dated Jul. 29, 2008, from corresponding European application.

* cited by examiner

*Primary Examiner* — Adolf Berhane
*Assistant Examiner* — Jeffrey Gblende
(74) *Attorney, Agent, or Firm* — Young & Thompson

(57) ABSTRACT

A reactor arrangement for alternating electrical current includes different coils (105, 107) for positive and negative half-cycles of the alternating electrical current. The negative and positive half-cycles of the alternating electrical current are directed to the different coils with the aid of unidirectional electrical components (106, 108) such as, for example, diodes. The both coils are arranged to magnetize a common magnetic core element (104) in a same direction. The reactor arrangement further includes at least one permanent magnet (109) that generates, into the magnetic core element, a biasing magnetic flux component having an opposite direction than that of magnetic flux components generated with the coils. Therefore, the biasing magnetic flux component generated with the permanent magnet relieves magnetic saturation of the magnetic core element. Hence, the size and the weight of the magnetic core element can be reduced.

18 Claims, 13 Drawing Sheets

REACTOR ARRANGEMENT FOR ALTERNATING ELECTRICAL CURRENT

FIELD OF THE INVENTION

The invention relates to a reactor arrangement suitable for alternating electrical current and to a method for providing inductive reactance for alternating electrical current. Furthermore, the invention relates to an electrical converter device having a reactor arrangement.

BACKGROUND

In conjunction with many electrical converter devices, e.g. a frequency converter, an inductive electrical component is needed between an inverter bridge arranged to produce e.g. multiphase alternating voltage and an electrical system connected to it, and/or between a rectifier bridge and an alternating voltage network. The inductive electrical component can be needed, for example, for reducing slew rate of output voltage of an inverter, for over-current protection, for reducing radio frequency emissions, and/or for suppressing harmonics of voltage and/or of electrical current. The physical size of an inductive electrical component can be reduced by providing the inductive electrical component with a magnetic core element that is made of magnetically amplifying material, i.e. material having the relative permeability greater than unity ($\mu_r > 1$). The magnetically amplifying material can be ferromagnetic or paramagnetic material. The magnetic core element is preferably made of soft magnetic material that provides low hysteresis losses, e.g. electrical steel sheets, soft magnetic powder, ferrites, etc. In many applications, the magnetic saturation of magnetically amplifying material causes problems in conjunction with inductive electrical components, e.g. non-linear phenomena that may be harmful in operation of an inductive electrical component. For example, dynamical inductance (a change of magnetic flux/a change of electrical current) may drastically diminish as a response to a situation in which a magnetic core element of an inductive electrical component gets magnetically saturated. Because of the above-mentioned facts, a magnetic core element of an inductive electrical component is traditionally dimensioned with respect to a pre-determined value of electrical current in such a way that the magnetic core element does not get too deeply saturated during operation. The requirement that the magnetic core element must not get too deeply saturated sets lower limits to the size and the weight of the inductive electrical component.

In a solution according to the prior art, an inductive electrical component that is used for limiting fluctuations of direct electrical current, i.e. dc-current, is provided with a permanent magnet. In this document dc-current means electrical current the value of which may fluctuate over time but the flowing direction of which does not change. The permanent magnet is arranged to generate into a ferromagnetic core of the inductive electrical component a biasing magnetic flux component that has an opposite direction with respect to a magnetic flux component generated by dc-current flowing in windings of the inductive electrical component. With the aid of the biasing magnetic flux component the maximum value of the dc-current that can be used without causing a too deep saturation of the ferromagnetic core can be e.g. doubled compared with a situation in which no biasing magnetic flux component is being used. An inductive electrical component of the kind described above is disclosed also in publication U.S. Pat. No. 3,968,465. The above-described solution according to the prior art is, however, suitable for only inductive electrical components that are used for limiting fluctuations of dc-current. In conjunction with an electrical converter device, e.g. a frequency converter, many inductive electrical components are, however, used as reactors for alternating electrical currents.

SUMMARY

In accordance with a first aspect of the invention, there is provided a new reactor arrangement that is suitable for alternating electrical current. The reactor arrangement comprises:

an alternating voltage terminal for receiving the alternating electrical current,
a first direct voltage terminal,
a second direct voltage terminal,
a magnetic core element made of magnetically amplifying material,
a first unidirectional electrical component and a first coil on a first electrical current path from the alternating voltage terminal to the first direct voltage terminal,
a second unidirectional electrical component and a second coil on a second electrical current path from the second direct voltage terminal to the alternating voltage terminal, and
at least one permanent magnet arranged to generate a biasing magnetic flux component into the magnetic core element, wherein the first unidirectional electrical component and the second unidirectional electrical component are arranged to direct the alternating electrical current to the first coil as a response to a situation in which the alternating electrical current is positive, and to the second coil, a response to a situation in which the alternating electrical current is negative, the first coil is arranged to magnetize the magnetic core element in a direction opposite to the biasing magnetic flux component as a response to a situation in which the alternating electrical current is directed to the first coil, and the second coil is arranged to magnetize the magnetic core element in the direction opposite to the biasing magnetic flux component as a response to a situation in which the alternating electrical current is directed to the second coil, and the biasing magnetic flux component generated with the at least one permanent magnet is capable of relieving magnetic saturation of the magnetic core element.

The magnetic core element of the reactor arrangement is magnetized in a same direction during both negative and positive temporal portions of the alternating electrical current. Therefore, the permanent magnet(s) can be used for generating such a biasing magnetic flux component that has an opposite direction with respect to the magnetic flux components produced by both the negative and positive temporal portions of the alternating electrical current. The biasing magnetic flux component generated with the permanent magnet(s) is capable of relieving magnetic saturation of the magnetic core element. Hence, the size of the magnetic core element can be smaller than that of a conventional reactor arrangement.

In accordance with a second aspect of the invention, there is provided a new electrical converter device that comprises a reactor arrangement according to the invention. The electrical converter device can be, e.g. an inverter, a rectifier, and/or a frequency converter.

In accordance with a third aspect of the invention, there is provided a new method for providing inductive reactance for alternating electrical current. The method comprises:

generating, with at least one permanent magnet, a biasing magnetic flux component into a magnetic core element made of magnetically amplifying material, directing the alternating electrical current to a first coil if the alternating electrical current is positive, the first coil being arranged to magnetize the magnetic core element in a direction opposite to the biasing magnetic flux component as a response to a situation in which the alternating electrical current is directed to the first coil, and directing the alternating electrical current to a second coil if the alternating electrical current is negative, the second coil being arranged to magnetize the magnetic core element in the direction opposite to the biasing magnetic flux component as a response to a situation in which the alternating electrical current is directed to the second coil, wherein the biasing magnetic flux component generated with the at least one permanent magnet is capable of relieving magnetic saturation of the magnetic core element.

A number of exemplifying embodiments of the invention are described in accompanied dependent claims.

Various embodiments of the invention both as to constructions and to methods of operation, together with additional objects and advantages thereof, will be best understood from the following description of specific exemplifying embodiments when read in connection with the accompanying drawings.

The exemplifying embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1A:
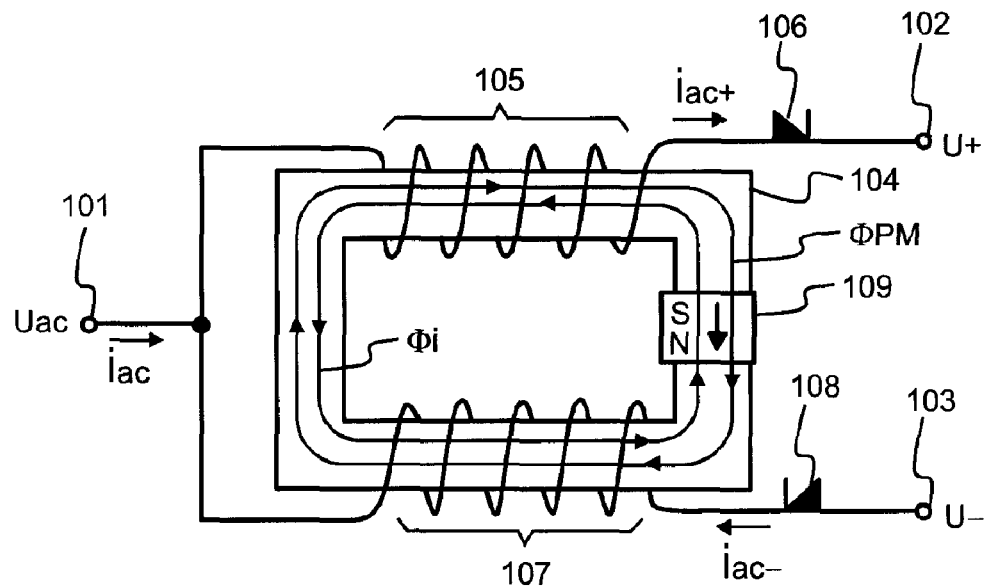
FIGS. 1a and 1b show circuit diagrams of reactor arrangements according to embodiments of the invention.

FIG. 1a shows a circuit diagram of a reactor arrangement according to an embodiment of the invention. The reactor arrangement comprises an alternating voltage terminal 101 for receiving alternating electrical current $i_{ac}$ from an external alternating voltage ($U_{ac}$) system. Without limiting generality, the alternating electrical current $i_{ac}$ can be defined to be positive when it flows in a direction of the arrow shown in conjunction with the alternating voltage terminal 101. The reactor arrangement comprises a first direct voltage terminal 102 and a second direct voltage terminal 103 for connecting to an external direct voltage (U+, U−) system. The reactor arrangement comprises a first unidirectional electrical component 106 and a first coil 105 on a first electrical current path from the alternating voltage terminal 101 to the first direct voltage terminal 102. The reactor arrangement comprises a second unidirectional electrical component 108 and a second coil 107 on a second electrical current path from the second direct voltage terminal 103 to the alternating voltage terminal 101. The unidirectional electrical component 106 can be any electrical component that can be used for allowing electrical current to flow in a direction shown by the arrow $i_{ac}+$ and for suppressing electrical current in a direction opposite to the arrow $i_{ac}+$. Correspondingly, the unidirectional electrical component 108 can be any electrical component that can be used for allowing electrical current to flow in a direction shown by the arrow $i_{ac}-$ and for suppressing electrical current in a direction opposite to the arrow $i_{ac}-$. Each of the unidirectional electrical components 106 and 108 can be, for example: a diode, a thyristor, a gate turn-off thyristor (GTO), a field effect transistor (FET), a bipolar transistor, an insulated gate bipolar transistor (IGBT), or a combination of two or more of the above-mentioned electrical components, respectively. In the attached figures, a half of a symbol of a diode is used as a symbol for a general unidirectional electrical component.

The reactor arrangement comprises a magnetic core element 104 made of magnetically amplifying material, i.e. material having the relative permeability greater than unity ($\mu_r > 1$). The magnetic core element can be made of ferromagnetic or paramagnetic material. The magnetic core element is preferably made of soft magnetic material that provides low hysteresis losses, e.g. electrical steel sheets, soft magnetic powder, ferrites, etc. The reactor arrangement comprises a permanent magnet 109 that is arranged to generate a biasing magnetic flux component $\Phi_{PM}$ into the magnetic core element. The arrow shown in a figure element representing the permanent magnet 109 indicates the direction of magnetization of the permanent magnet. The unidirectional electrical components 106 and 108 are arranged to direct the alternating electrical current $i_{ac}$ to the coil 105 as a response to a situation in which the alternating electrical current is positive, and to the coil 107, a response to a situation in which the alternating electrical current is negative. The coil 105 is arranged to magnetize the magnetic core element 104 in a direction opposite to the biasing magnetic flux component $\Phi_{PM}$ as a response to a situation in which the alternating electrical current $i_{ac}$ is directed to the coil 105. The coil 107 is arranged to magnetize the magnetic core element 104 in the direction opposite to the biasing magnetic flux component $\Phi_{PM}$ as a response to a situation in which the alternating electrical $i_{ac}$ current is directed to the coil 107. A magnetic flux component generated with the coil 105 or with the coil 107 is denoted by $\Phi_i$ in FIG. 1a.

The principle described above and in FIG. 1a provides savings in the size of the magnetic core element 104 that is needed for a certain peak value of the alternating electrical current $i_{ac}$. It is, however, recommendable to design the magnetic core element 104 and the permanent magnet 109 and to control the peak values of the alternating electrical current $i_{ac}$ in such a way that irreversible demagnetisation of the permanent magnet 109 can be avoided.

The permanent magnet 109 can be made of, for example, AlNiCo-steel (Aluminium-Nickel-Cobalt) or a rare earth-metal permanent magnet material such as e.g. Samarium-Cobalt permanent magnet material and NbFeB-permanent magnet material (Neodymium-Iron-Boron).

Figure 1B:
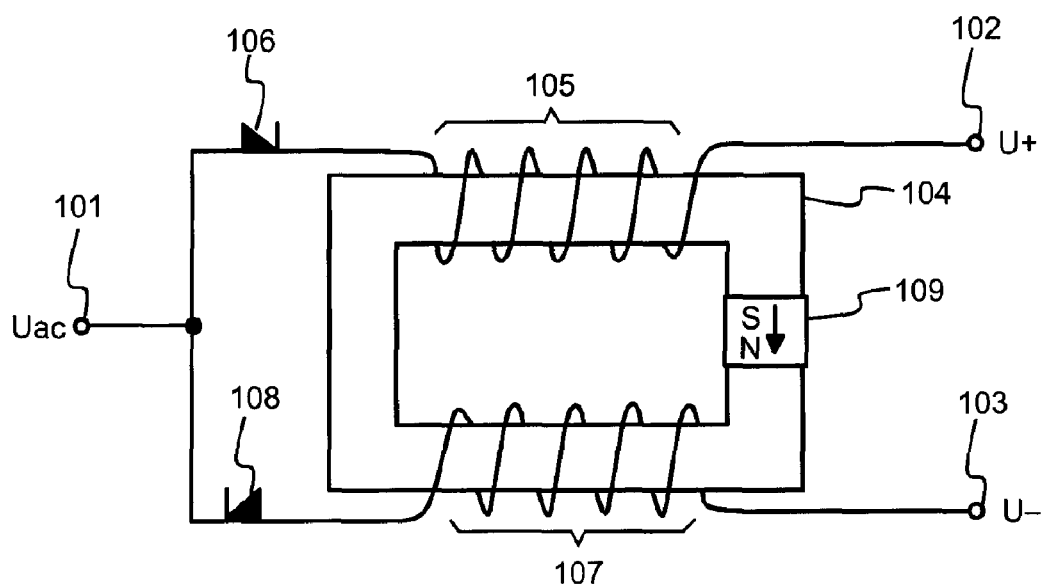

FIG. 1b shows a circuit diagram of a reactor arrangement according to an embodiment of the invention in which the unidirectional electrical components 106 and 108 are in different positions with respect to the coils 105 and 107 than in the reactor arrangement shown in FIG. 1a. In the reactor arrangement shown in FIG. 1b, the unidirectional electrical component 106 is located between the alternating voltage terminal 101 and the coil 105 on the electrical current path from the alternating voltage terminal to the first direct voltage terminal 102. The unidirectional electrical component 108 is located between the coil 107 and the alternating voltage terminal 101 on the electrical current path from the second direct voltage terminal 103 to the alternating voltage terminal.

Figure 2:
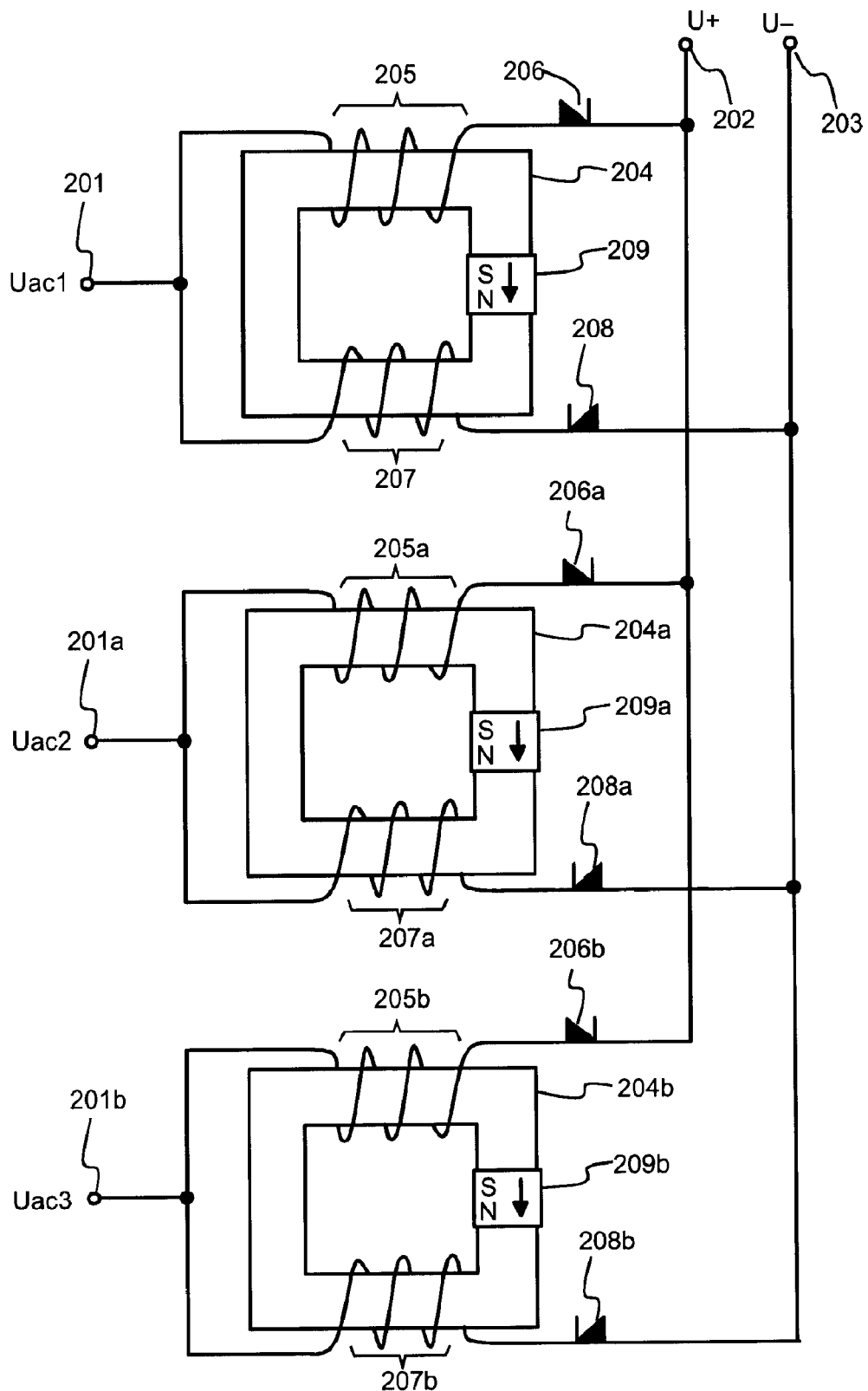
FIG. 2 shows a circuit diagram of a multiphase reactor arrangement according to an embodiment of the invention.

FIG. 2 shows a circuit diagram of a multiphase reactor arrangement according to an embodiment of the invention. The reactor arrangement comprises three alternating voltage (Uac1, Uac2, Uac3) terminals 201, 201a, and 201b. The alternating voltage terminal 201 is coupled to a first direct voltage terminal 202 and to a second direct voltage terminal 203 via two unidirectional electrical components 206 and 208, and via two coils 205 and 207 in the same way as in the reactor arrangement shown in FIG. 1a, wherein the alternating voltage terminal 101 is connected to the first direct voltage terminal 102 and to the second direct voltage terminal 103 via the unidirectional electrical components 106 and 108 and the coils 105 and 107. The alternating voltage terminal 201a is coupled to a first direct voltage terminal 202 and to a second direct voltage terminal 203 via two unidirectional electrical components 206a and 208a, and via two coils 205a and 207a in the same way as, in FIG. 1a, the alternating voltage terminal 101 is connected to the first direct voltage terminal 102 and to the second direct voltage terminal 103 via the unidirectional electrical components 106 and 108 and the coils 105 and 107. The alternating voltage terminal 201b is coupled to a first direct voltage terminal 202 and to a second direct voltage terminal 203 via two unidirectional electrical components 206b and 208b, and via two coils 205b and 207b in the same way as, in FIG. 1a, the alternating voltage terminal 101 is connected to the first direct voltage terminal 102 and to the second direct voltage terminal 103 via the unidirectional electrical components 106 and 108 and the coils 105 and 107. The reactor arrangement comprises a separate magnetic core element 204, 204a, 204b and a separate permanent magnet 209, 209a, 209b for each alternating voltage terminal 201, 201a, and 201b, respectively. Coils associated with a certain alternating voltage terminal are arranged to magnetize a corresponding magnetic core element in first direction, and a corresponding permanent magnet is arranged to magnetize the corresponding magnetic core element in a second direction that is opposite with respect to the first direction.

The number of alternating voltage phases is three in conjunction with the reactor arrangement shown in FIG. 2. The principle shown in FIG. 2 can be, however, utilised in a straightforward manner in conjunction with any other number of alternative voltage phases.

Figure 3:
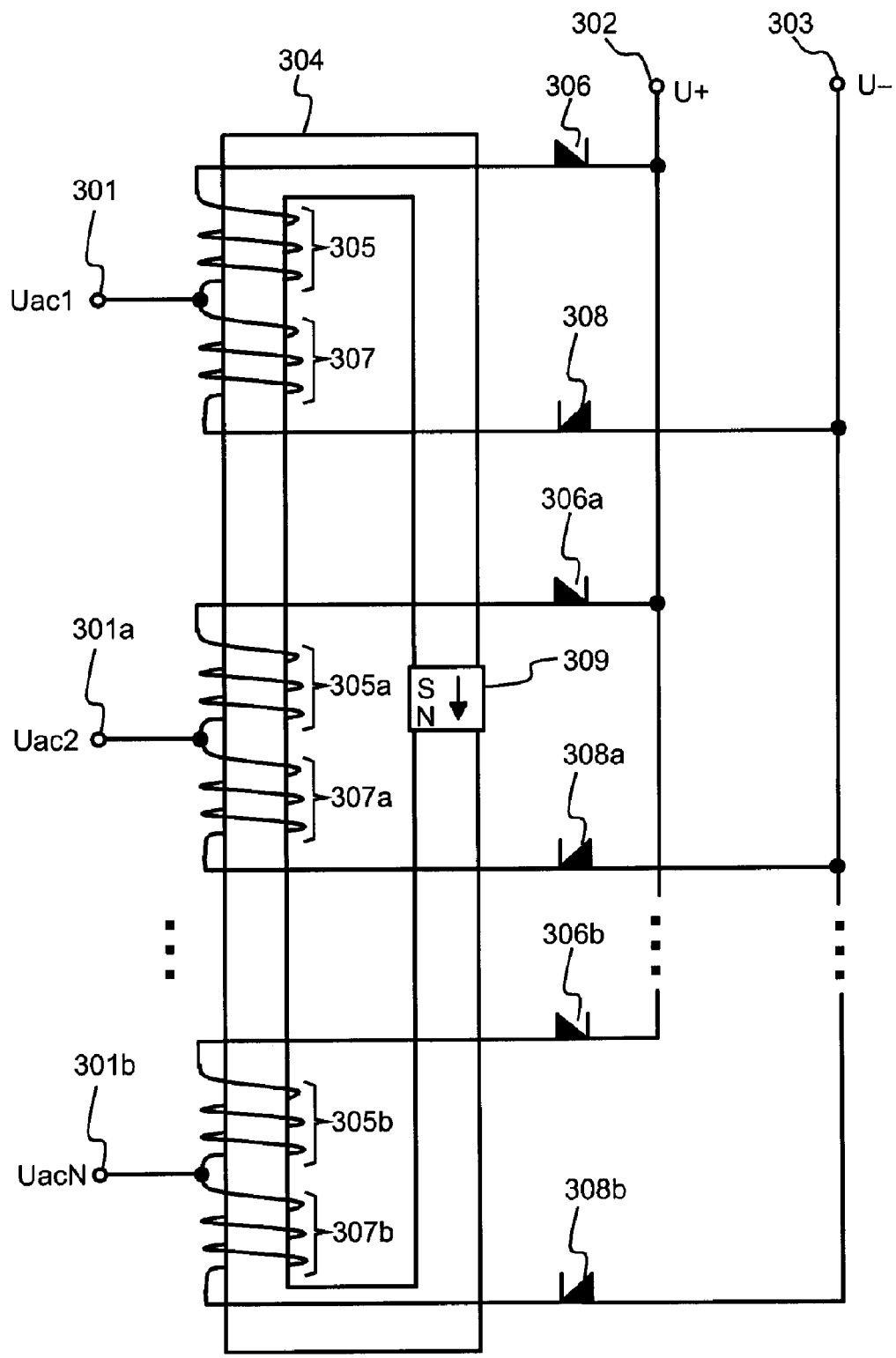
FIG. 3 shows a circuit diagram of a multiphase reactor arrangement according to an embodiment of the invention.

FIG. 3 shows a circuit diagram of a multiphase reactor arrangement according to an embodiment of the invention. The reactor arrangement comprises N alternating voltage (Uac1 . . . . UacN) terminals 301, 301a, . . . , 301b. The alternating voltage terminal 301 is coupled to a first direct voltage terminal 302 and to a second direct voltage terminal 303 via two unidirectional electrical components 306 and 308, and via two coils 305 and 307 in the same way as in the reactor arrangement shown in FIG. 1a, wherein the alternating voltage terminal 101 is connected to the first direct voltage terminal 102 and to the second direct voltage terminal 103 via the unidirectional electrical components 106 and 108 and the coils 105 and 107. The alternating voltage terminal 301a is coupled to a first direct voltage terminal 302 and to a second direct voltage terminal 303 via two unidirectional electrical components 306a and 308a, and via two coils 305a and 307a in the same way as, in FIG. 1a, the alternating voltage terminal 101 is connected to the first direct voltage terminal 102 and to the second direct voltage terminal 103 via the unidirectional electrical components 106 and 108 and the coils 105 and 107. The alternating voltage terminal 301b is coupled to a first direct voltage terminal 302 and to a second direct voltage terminal 303 via two unidirectional electrical components 306b and 308b, and via two coils 305b and 307b in the same way as, in FIG. 1a, the alternating voltage terminal 101 is connected to the first direct voltage terminal 102 and to the second direct voltage terminal 103 via the unidirectional electrical components 106 and 108 and the coils 105 and 107. The coils 305, 307, 305a, 307a, . . . , 305b, 307b are arranged to magnetize a common magnetic core element 304 in a first direction. A permanent magnet 309 is arranged to magnetize the common magnetic core element in a second direction that is opposite with respect to the first direction. In FIG. 3, the shape of the magnetic core element 304 is a rectangle. The shape of the magnetic core element can be as well, for example, a toroid or a polygon that has as many angles as there are alternating voltage phases (e.g. a triangle for three phase alternating voltage). Each leg of a polygon is preferably dedicated for coils related to one alternating voltage phase, e.g. coils 305 and 307 can be wound around a first leg of the polygon, coils 305a and 307a can be wound around a second leg of the polygon, etc.

Figure 4:
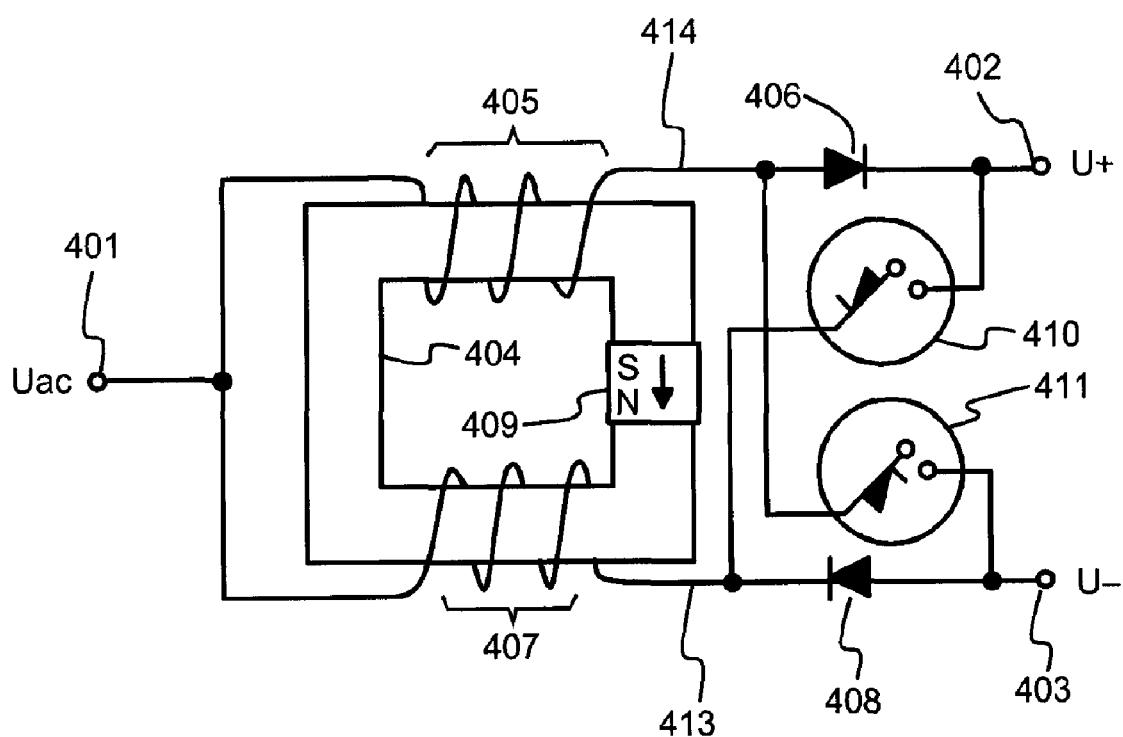
FIG. 4 shows a circuit diagram of a reactor arrangement according to an embodiment of the invention.

FIG. 4 shows a circuit diagram of a reactor arrangement according to an embodiment of the invention. The reactor arrangement comprises an alternating voltage terminal 401 for receiving alternating electrical current from an external alternating voltage ($U_{ac}$) system. The reactor arrangement comprises a first direct voltage terminal 402 and a second direct voltage terminal 403 for connecting to an external direct voltage (U+, U−) system. The reactor arrangement comprises a first unidirectional electrical component 406 and a first coil 405 on a first electrical current path from the alternating voltage terminal 401 to the first direct voltage terminal 402. The reactor arrangement comprises a second unidirectional electrical component 408 and a second coil 407 on a second electrical current path from the second direct voltage terminal 403 to the alternating voltage terminal 401. The reactor arrangement comprises a magnetic core element 404 and a permanent magnet 409 that is arranged to generate a biasing magnetic flux component into the magnetic core element. The arrow shown in a figure element representing the permanent magnet 409 indicates the direction of magnetization of the permanent magnet. The unidirectional electrical components 406 and 408 are arranged to direct the alternating electrical current to the coil 405 as a response to a situation in which the alternating electrical current is positive, and to the coil 407, a response to a situation in which the alternating electrical current is negative. The coil 405 is arranged to magnetize the magnetic core element in a direction opposite to the biasing magnetic flux component as a response to a situation in which the alternating electrical current is directed to the coil 405. The coil 407 is arranged to magnetize the magnetic core element in a direction opposite to the biasing magnetic flux component as a response to a situation in which the alternating electrical current is directed to the coil 407.

The unidirectional electrical component 406 is located between the coil 405 and the first direct voltage terminal 402 on the electrical current path from the alternating voltage terminal 401 to the first direct voltage terminal 402. The unidirectional electrical component 408 is located between the second direct voltage terminal 403 and the coil 407 on the electrical current path from the second direct voltage terminal 403 to the alternating voltage terminal 401. The reactor arrangement comprises a first controllable electrical switch 410 arranged to form an unidirectional electrical current path from the first direct voltage terminal 402 to an electrical node 413 that is between the unidirectional electrical component 408 and the coil 407. The reactor arrangement comprises a second controllable electrical switch 411 arranged to form an unidirectional electrical current path from an electrical node 414 that is between the coil 405 and the unidirectional electrical component 406 to the second direct voltage terminal 403. With the aid of the controllable electrical switches 410 and 411 it is possible to transfer energy, not only in a direction from the alternating voltage terminal 401 to the direct voltage terminals 402 and 403, but also in the opposite direction from the direct voltage terminals to the alternating voltage terminal.

Each of the controllable electrical switches 410 and 411 can be, for example: a thyristor, a gate turn-off thyristor (GTO), a field effect transistor (FET), a bipolar transistor, and an insulated gate bipolar transistor (IGBT), or a combination of two or more above-mentioned electrical components, respectively. In FIG. 4, a combination of a symbol of a switch and a half symbol of a diode is used as a symbol for a general controllable electrical switch that is capable of forming a controllable unidirectional electrical current path.

Figure 5:
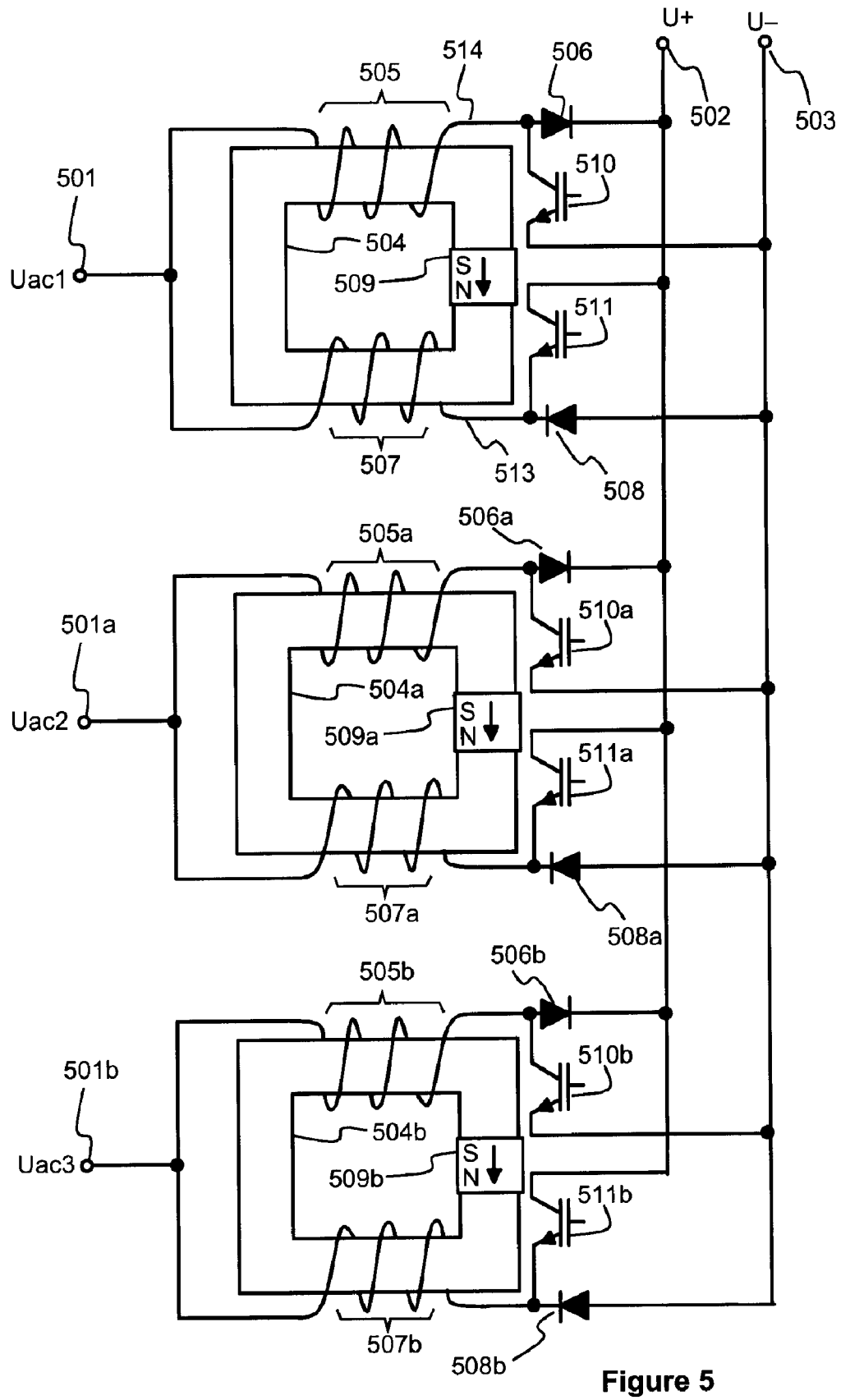
FIG. 5 shows a circuit diagram of a multiphase reactor arrangement according to an embodiment of the invention.

FIG. 5 shows a circuit diagram of a multiphase reactor arrangement according to an embodiment of the invention. The reactor arrangement comprises three alternating voltage (Uac1, Uac2, Uac3) terminals 501, 501a, and 501b. The alternating voltage terminal 501 is coupled to a first direct voltage terminal 502 and to a second direct voltage terminal 503 via two unidirectional electrical components 506 and 508, via two controllable electrical switches 510 and 511, and via two coils 505 and 507 in the same way as in the reactor arrangement shown in FIG. 4, wherein the alternating voltage terminal 401 is connected to the first direct voltage terminal 402 and to the second direct voltage terminal 403 via the unidirectional electrical components 406 and 408, controllable electrical switches 410 and 411, and the coils 405 and 407. The alternating voltage terminal 501a is coupled to a first direct voltage terminal 502 and to a second direct voltage terminal 503 via two unidirectional electrical components 506a and 508a, via two controllable electrical switches 510a and 511a, and via two coils 505a and 507a in the same way as, in FIG. 4, the alternating voltage terminal 401 is connected to the first direct voltage terminal 402 and to the second direct voltage terminal 403 via the unidirectional electrical components 406 and 408, controllable electrical switches 410 and 411, and the coils 405 and 407. The alternating voltage terminal 501b is coupled to a first direct voltage terminal 502 and to a second direct voltage terminal 503 via two unidirectional electrical components 506b and 508b, via two controllable electrical switches 510b and 511b, and via two coils 505b and 507b in the same way as, in FIG. 4, the alternating voltage terminal 401 is connected to the first direct voltage terminal 402 and to the second direct voltage terminal 403 via the unidirectional electrical components 406 and 408, controllable electrical switches 410 and 411, and the coils 405 and 407. In this exemplifying embodiment of the invention, the unidirectional electrical components 506, 508, 506a, 508a, 506b, and 508b are diodes and the controllable electrical switches 510, 511, 510a, 511a, 510b, and 511b are insulated gate bipolar transistor (IGBT).

The reactor arrangement comprises a separate magnetic core element 504, 504a, 504b and a separate permanent magnet 509, 509a, 509b for each alternating voltage terminal 501, 501a, and 501b, respectively. Coils associated with a certain alternating voltage terminal are arranged to magnetize a corresponding magnetic core element in a first direction, and a corresponding permanent magnet is arranged to magnetize the corresponding magnetic core element in a second direction that is opposite with respect to the first direction.

The number of alternating voltage phases is three in conjunction with the reactor arrangement shown in FIG. 5. The principles shown in FIG. 5 can be, however, utilised in a straightforward manner in conjunction with any other number of alternative voltage phases.

Figure 6:
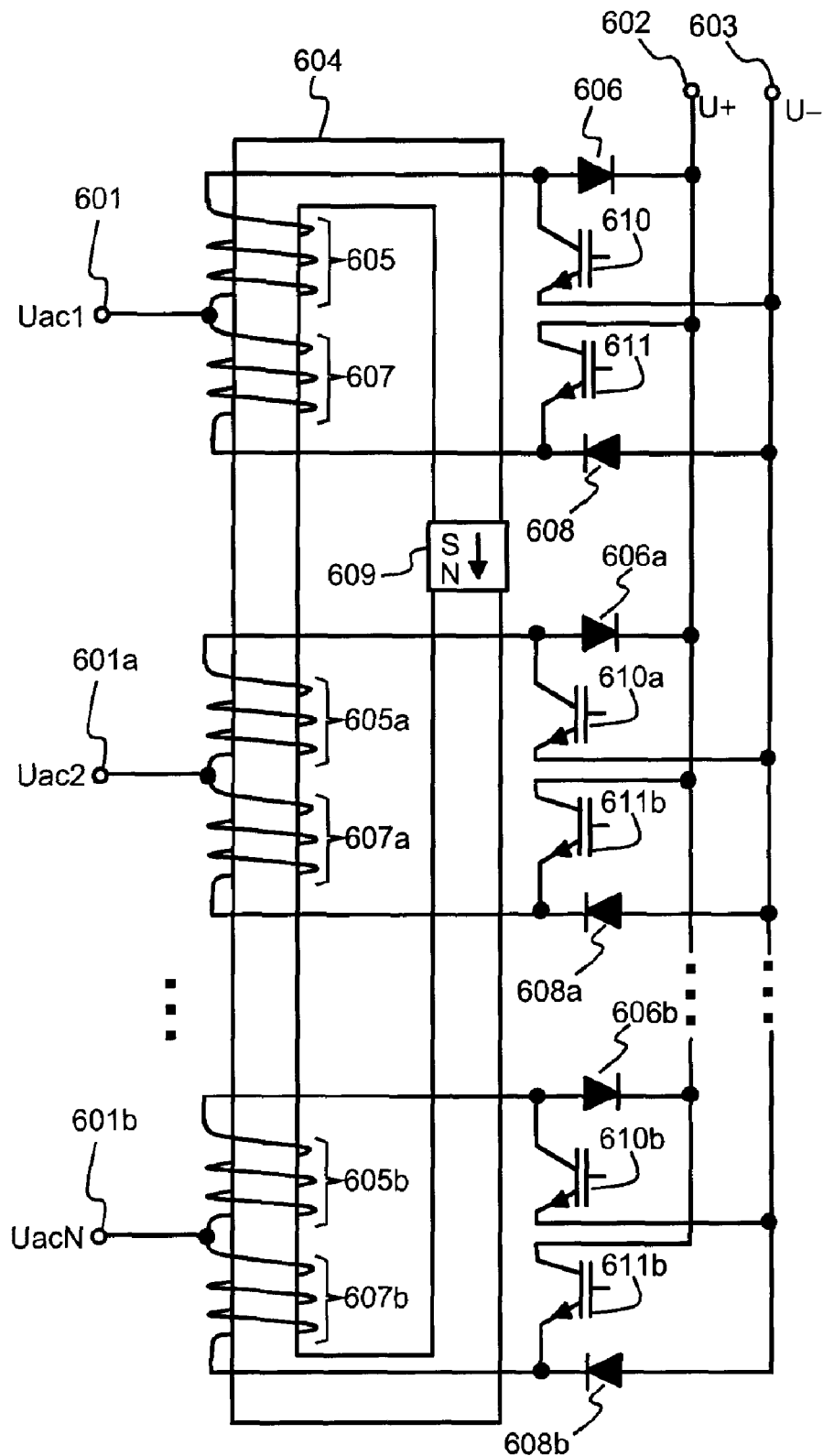
FIG. 6 shows a circuit diagram of a multiphase reactor arrangement according to an embodiment of the invention.

FIG. 6 shows a circuit diagram of a multiphase reactor arrangement according to an embodiment of the invention. The reactor arrangement comprises N alternating voltage (Uac1 . . . . UacN) terminals 601, 601a, . . . , 601b. The alternating voltage terminal 601 is coupled to a first direct voltage terminal 602 and to a second direct voltage terminal 603 via two unidirectional electrical components 606 and 608, via two controllable electrical switches 610 and 611, and via two coils 605 and 607 in the same way as in the reactor arrangement shown in FIG. 4, wherein the alternating voltage terminal 401 is connected to the first direct voltage terminal 402 and to the second direct voltage terminal 403 via the unidirectional electrical components 406 and 408, controllable electrical switches 410 and 411, and the coils 405 and 407. The alternating voltage terminal 601a is coupled to a first direct voltage terminal 602 and to a second direct voltage terminal 603 via two unidirectional electrical components 606a and 608a, via two controllable electrical switches 610a and 611a, and via two coils 605a and 607a in the same way as, in FIG. 4, the alternating voltage terminal 401 is connected to the first direct voltage terminal 402 and to the second direct voltage terminal 403 via the unidirectional electrical components 406 and 408, controllable electrical switches 410 and 411, and the coils 405 and 407. The alternating voltage terminal 601b is coupled to a first direct voltage terminal 602 and to a second direct voltage terminal 603 via two unidirectional electrical components 606b and 608b, via two controllable electrical switches 610b and 611b, and via two coils 605b and 607b in the same way as, in FIG. 4, the alternating voltage terminal 401 is connected to the first direct voltage terminal 402 and to the second direct voltage terminal 403 via the unidirectional electrical components 406 and 408, controllable electrical switches 410 and 411, and the coils 405 and 407. In this exemplifying embodiment of the invention, the unidirectional electrical components 606, 608, 606a, 608a, . . . , 606b, 608b are diodes and the controllable electrical switches 610, 611, 610a, 611a, . . . , 610b, 611b are insulated gate bipolar transistor (IGBT). The coils 605, 607, 605a, 607a, . . . , 605b, 607b are arranged to magnetize a common magnetic core element 604 in a first direction. A permanent magnet 609 is arranged to magnetize the common magnetic core element in a second direction that is opposite with respect to the first direction.

Figure 7A:
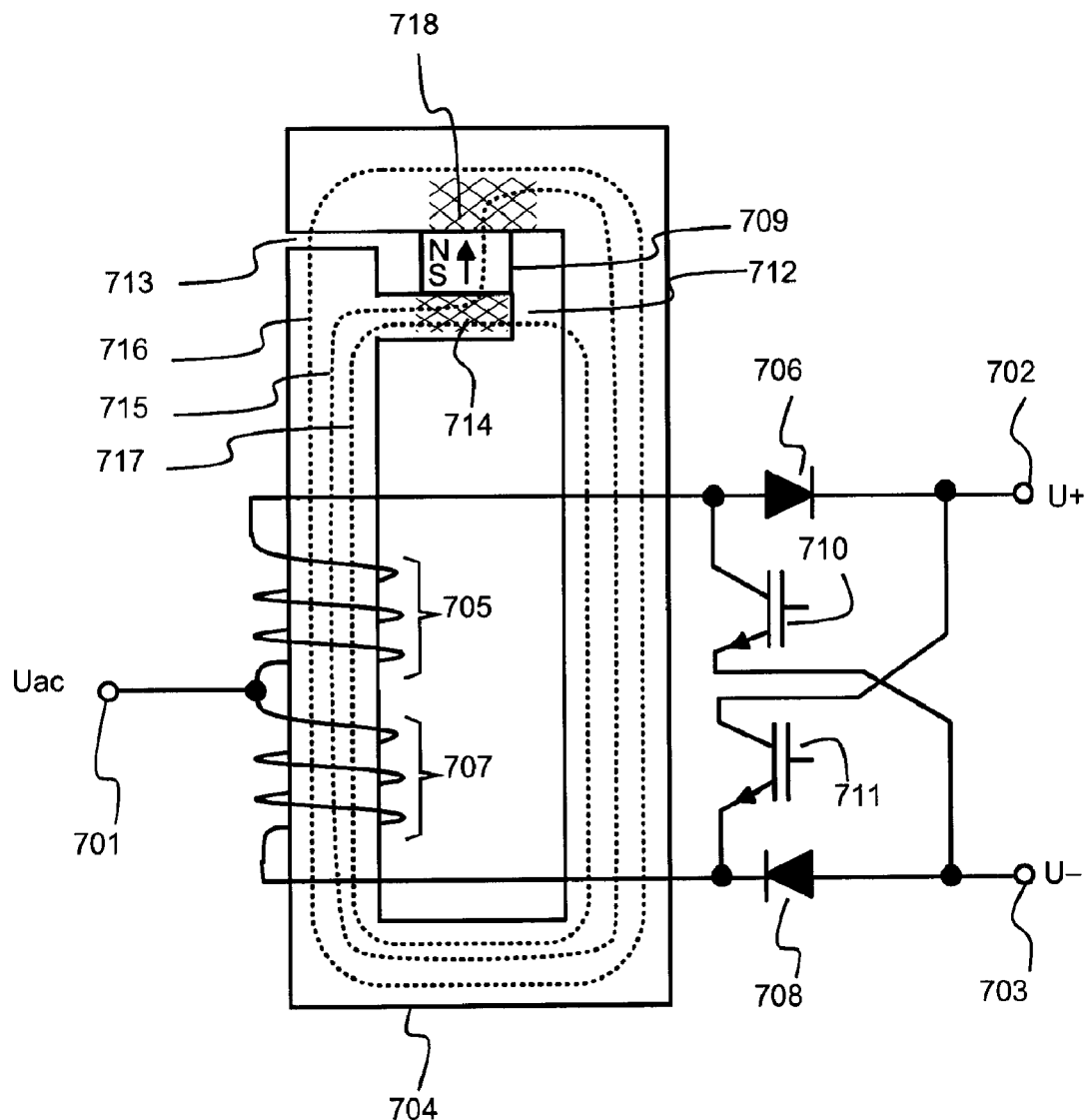
FIGS. 7a and 7b show circuit diagrams of reactor arrangements according to embodiments of the invention.

FIG. 7a shows a circuit diagram of a reactor arrangement according to an embodiment of the invention. The reactor arrangement comprises an alternating voltage (Uac) terminal 701. The alternating voltage terminal 701 is coupled to a first direct voltage terminal 702 and to a second direct voltage terminal 703 via two unidirectional electrical components 706 and 708, via two controllable electrical switches 710 and 711, and via two coils 705 and 707 in the same way as in the reactor arrangement shown in FIG. 4, wherein the alternating voltage terminal 401 is connected to the first direct voltage terminal 402 and to the second direct voltage terminal 403 via the unidirectional electrical components 406 and 408, controllable electrical switches 410 and 411, and the coils 405 and 407. A magnetic core element 704 is arranged to form, in addition to a magnetic flux path 715 between a north pole (N) of a permanent magnet 709 and a south pole (S) of the permanent magnet, a first additional magnetic flux path 716 arranged to by-pass the permanent magnet via a first magnetic-gap 713 and a second additional magnetic flux path 717 arranged to by-pass the permanent magnet via a second magnetic-gap 712. The magnetic-gaps can contain for example air, plastic, or some other material that has a smaller relative permeability ($\mu_r$) than that of the magnetically amplifying material of the magnetic core element 704. The magnetic flux paths 715, 716, and 717 are illustrated with dashed curves in FIG. 7a. A part 718 of the magnetic core element that abuts to the north pole of the permanent magnet belongs to the additional magnetic flux path 716. A part 714 of the magnetic core element that abuts to the south pole of the permanent magnet belongs to the additional magnetic flux path 717. The above-mentioned parts 714 and 718 of the magnetic core element are illustrated with cross hatching in FIG. 7a.

Electrical current that flows in the coil 705 or in the coil 707 may get exceptionally high values during short circuits and other faults and anomalies. In the reactor arrangement shown in FIG. 7a, the magnetic flux components that flow via the additional magnetic paths 716 and 717 saturate the magnetic core element 704 in the vicinity of the permanent magnet 709 when exceptionally strong electrical current flows in the coil 705 or in the coil 707. Due to the magnetic saturation in the vicinity of the permanent magnet, the ability of the magnetic core element to direct demagnetizing magnetic field into the permanent magnet is decreased. Hence, the permanent magnet is protected against irreversible demagnetization during short circuits and other situations in which exceptionally strong electrical current flows in the coil 705 or in the coil 707.

The physical dimensions of the magnetic-gaps 712 and 713 and the other physical dimensions of the magnetic core element 704 are preferably designed such that reluctance for a biasing magnetic flux component produced with the permanent magnet 709 is smallest through the magnetic flux path 715. In other words, the design of the magnetic-gaps and the magnetic core element are arranged to force the biasing magnetic flux to flow mainly through the magnetic flux path 715 instead of being shorted through the magnetic-gaps 712 and 713. Suitable shapes and dimensions for the magnetic core element 704, for the permanent magnet 709, and for the magnetic-gaps 712 and 713 can be found with simulations and prototype testing. For example, numerical field calculation based on a finite element method (FEM) can be used in simulations.

Figure 7B:
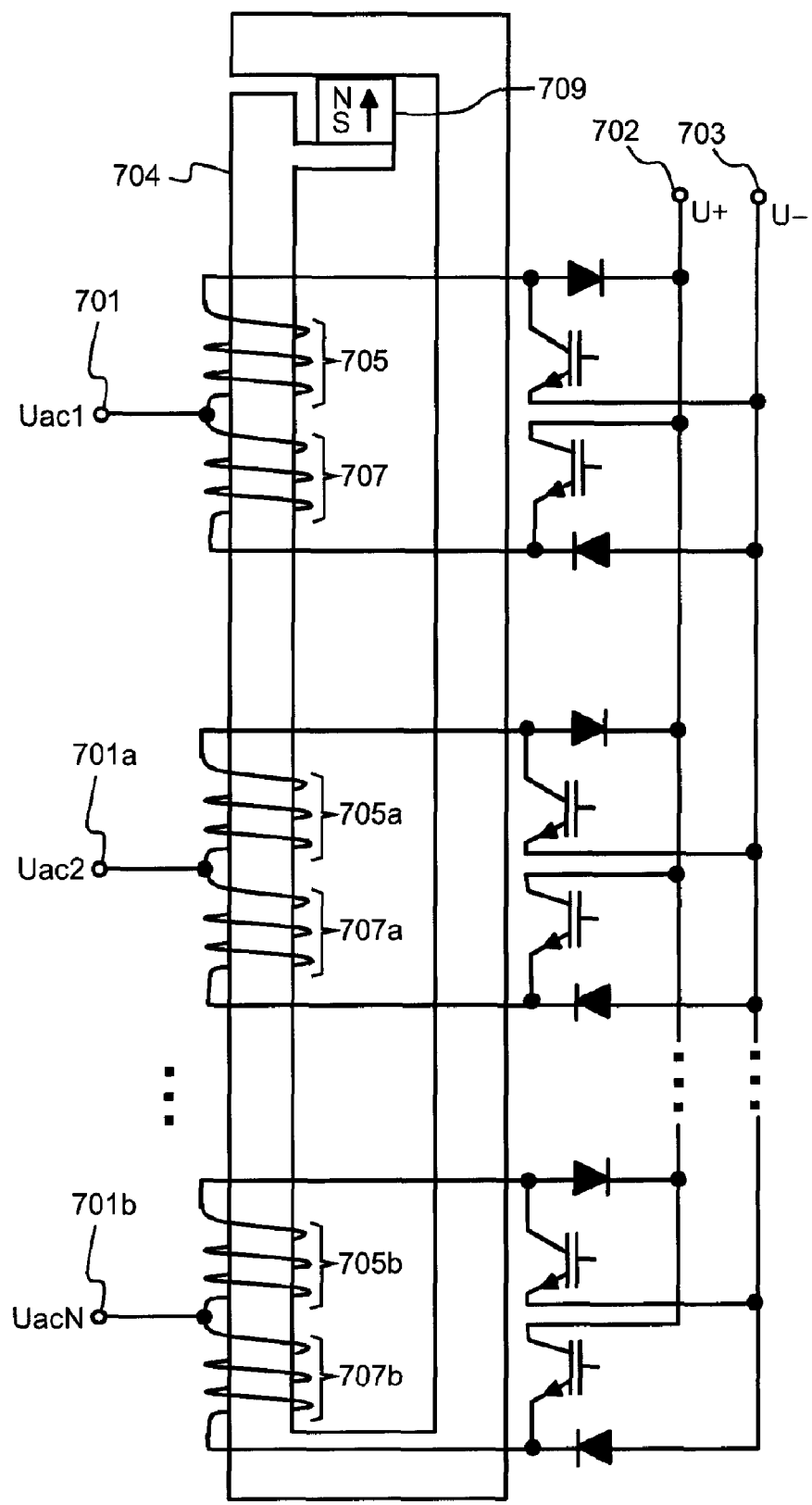

FIG. 7b shows a circuit diagram of a multiphase reactor arrangement according to an embodiment of the invention. The reactor arrangement comprises N alternating voltage (Uac1 . . . UacN) terminals 701, 701a, . . . , 701b. The alternating voltage terminals 701, 701a, . . . , 701b are connected to a first direct voltage terminal 702 and to a second direct voltage terminal 703 in a similar manner as in the multiphase reactor arrangement shown in FIG. 6. The above-described principle that is utilized in the magnetic core element shown in FIG. 7a is also utilized in the magnetic core element shown in FIG. 7b; i.e. the magnetic core element is arranged to form, in addition to a magnetic flux path between north and south poles of a permanent magnet, a first additional magnetic flux path arranged to by-pass the permanent magnet via a first magnetic-gap and a second additional magnetic flux path arranged to by-pass the permanent magnet via a second magnetic-gap.

In the exemplifying reactor arrangements that are shown in FIGS. 1a, 1b, 2-6, 7a, and 7b a biasing magnetic flux component is generated into a magnetic core element using a single permanent magnet. It should be, however, noted that the biasing magnetic flux component can be generated into a magnetic core element as well by using two or more permanent magnets. The number of permanent magnets is a design choice that depends on several factors related to design and application needs.

Figure 8:
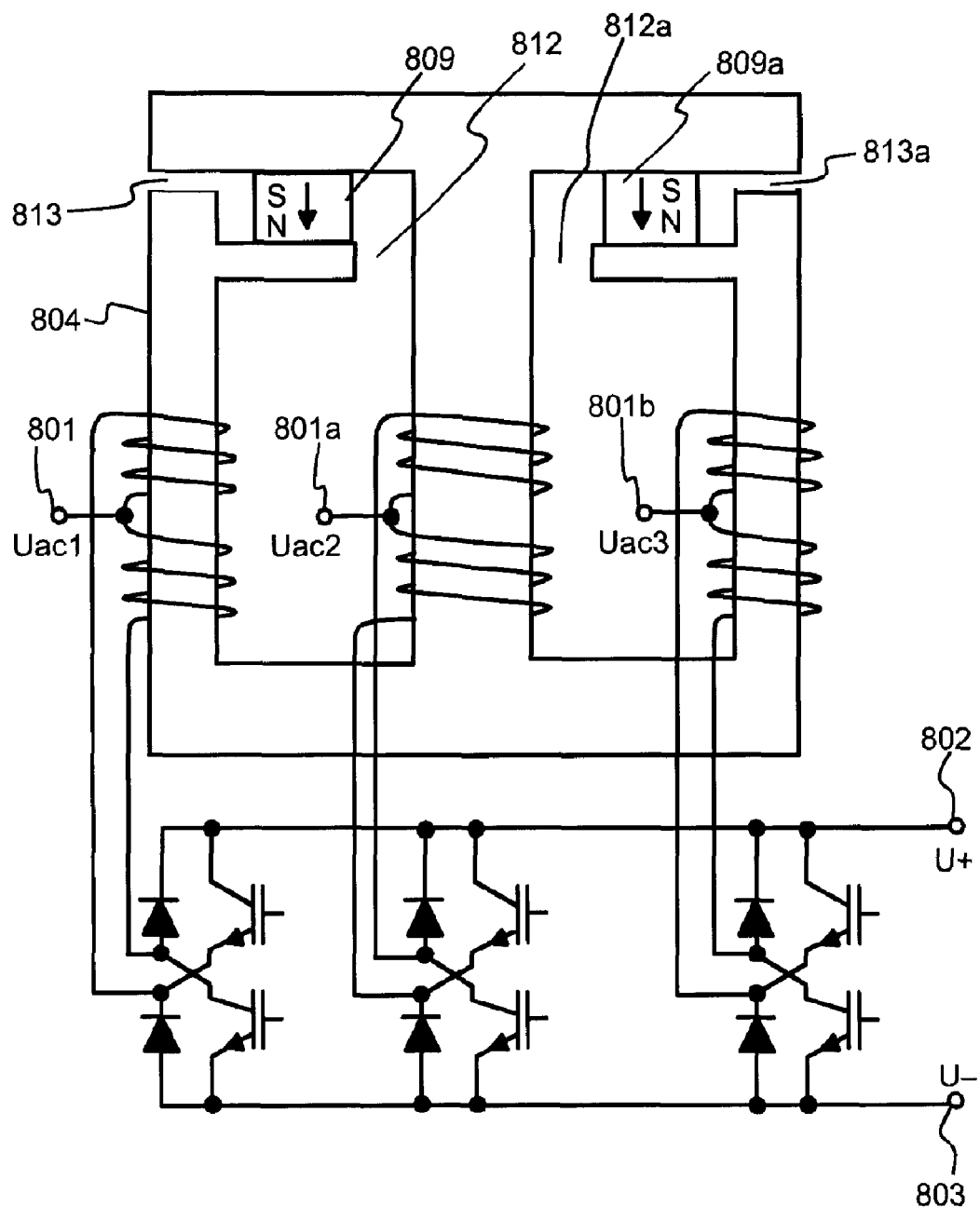
FIG. 8 shows a circuit diagram of a multiphase reactor arrangement according to an embodiment of the invention.

FIG. 8 shows a circuit diagram of a multiphase reactor arrangement according to an embodiment of the invention. The reactor arrangement comprises three alternating voltage (Uac1, Uac2, Uac3) terminals 801, 801a, and 801b. Each of the alternating voltage terminals 801, 801a, and 801b is connected to a first direct voltage terminal 802 and to a second direct voltage terminal 803 via two coils, two unidirectional electrical components, and two controllable electrical switches in the same way as the alternating voltage terminal 701 is coupled to the first and second direct voltage terminals 702 and 703 in the reactor arrangement shown in FIG. 7a. A magnetic core element 804 is arranged to form together with magnetic-gaps 812, 813, 812a, and 813a magnetic flux paths that by-pass permanent magnets 809 and 809a in a corresponding manner as the magnetic flux paths 716 and 717 by-pass the permanent magnet 709 in the reactor arrangement shown in FIG. 7a. The structure of the magnetic core element 804 is arranged to protect the permanent magnets 809 and 809a from irreversible demagnetization in the same way as the structure of the magnetic core element 704 of the reactor arrangement shown in FIG. 7a. The physical dimensions of the magnetic-gaps 812, 813, 812a and 813a and the other physical dimensions of the magnetic core element 804 are preferably designed such that reluctance for a biasing magnetic flux component produced with the permanent magnets 809 and 809a is smallest through the magnetic core element. In other words, the design of the magnetic-gaps and the magnetic core element are arranged to force the biasing magnetic flux to flow mainly through the magnetic core element instead of being shorted through the magnetic-gaps.

Figure 9:
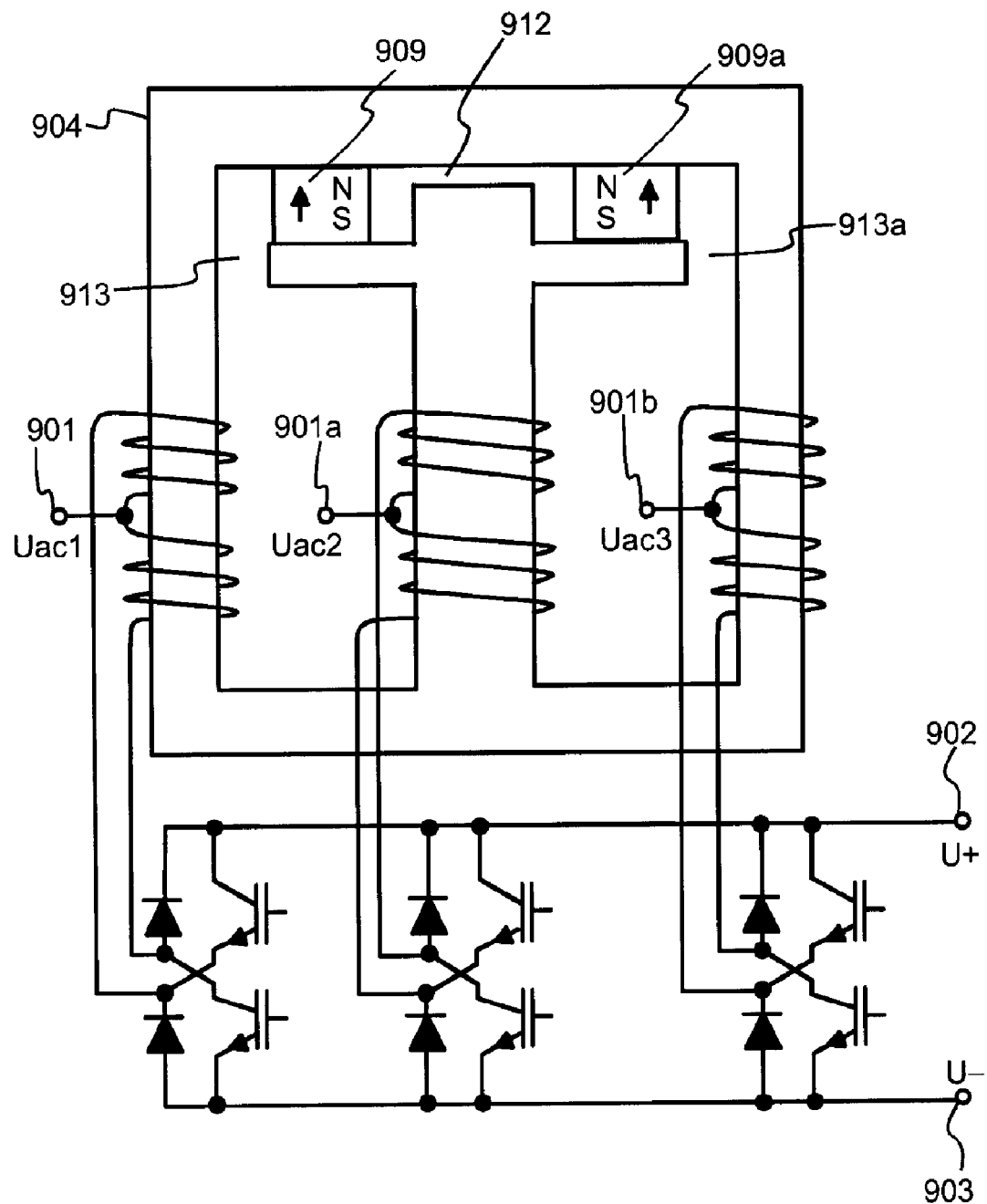
FIG. 9 shows a circuit diagram of a multiphase reactor arrangement according to an embodiment of the invention.

FIG. 9 shows a circuit diagram of a multiphase reactor arrangement according to an embodiment of the invention. The reactor arrangement comprises three alternating voltage (Uac1, Uac2, Uac3) terminals 901, 901a, and 901b. Each of the alternating voltage terminals 901, 901a, and 901b is connected to a first direct voltage terminal 902 and to a second direct voltage terminal 903 in via two coils, two unidirectional electrical components, and two controllable electrical switches in the same way as the alternating voltage terminal 701 is coupled to the first and second direct voltage terminals 702 and 703 in the reactor arrangement shown in FIG. 7. A magnetic core element 904 is arranged to form together with magnetic-gaps 912, 913, and 913a magnetic flux paths that by-pass permanent magnets 909 and 909a in a corresponding manner as the magnetic flux paths 716 and 717 by-pass the permanent magnet 709 in the reactor arrangement shown in FIG. 7. The structure of the magnetic core element 904 is arranged to protect the permanent magnets 909 and 909a from irreversible demagnetization in the same way as the structure of the magnetic core element 704 of the reactor arrangement shown in FIG. 7. The physical dimensions of the magnetic-gaps 912, 913, and 913a and the other physical dimensions of the magnetic core element 904 are preferably designed such that reluctance for a biasing magnetic flux component produced with the permanent magnets 909 and 909a is smallest through the magnetic core element. In other words, the design of the magnetic-gaps and the magnetic core element are arranged to force the biasing magnetic flux to flow mainly through the magnetic core element instead of being shorted through the magnetic-gaps.

Figure 10:
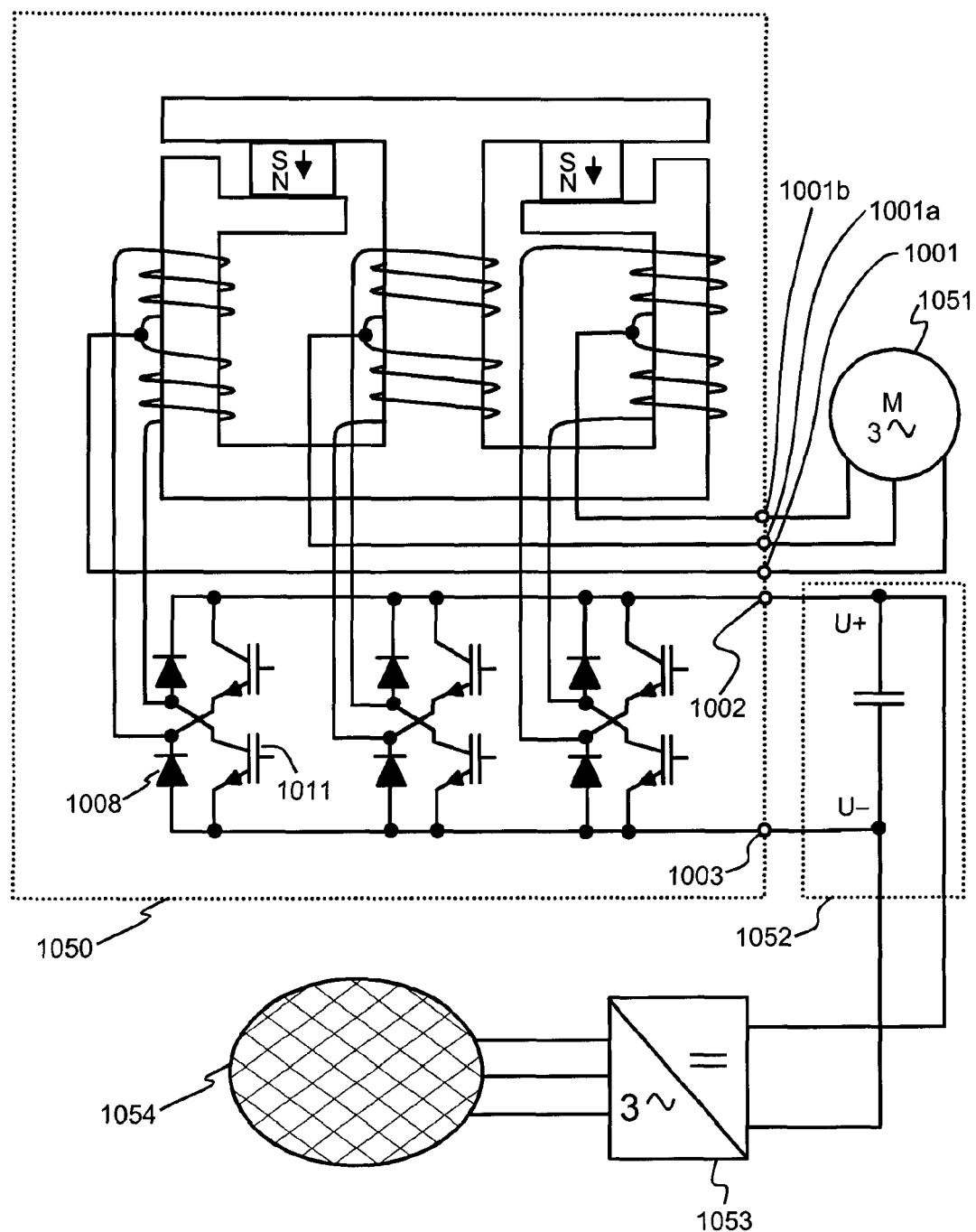
FIG. 10 shows a circuit diagram of an electrical converter device according to an embodiment of the invention.

FIG. 10 shows a circuit diagram of an electrical converter device according to an embodiment of the invention. The electrical converter device comprises a reactor arrangement 1050. Alternating voltage terminals 1001, 1001a, and 1001b of the reactor arrangement constitute terminals for connecting the electrical converter device to a load 1051. In the exemplifying situation shown in FIG. 10 the load is a three phase alternating current motor. The load can be as well some other electrical device, e.g. an induction heater. An intermediate circuit 1052 of the electrical converter device is coupled between a first direct voltage terminal 1002 and a second direct voltage terminal 1003 of the reactor arrangement. The reactor arrangement 1050 is similar to the reactor arrangement shown in FIG. 8, but the reactor arrangement could be as well according to another embodiment of the invention than that shown in FIG. 8. For example, the reactor arrangement 1050 could be according to what is depicted in FIG. 5 or 6 or 7b. The reactor arrangement 1050 constitutes a main circuit of a converter unit that is able to transfer energy from the intermediate circuit 1052 to the load 1051 and also to transfer energy from the load to the intermediate circuit. Control systems of the said converter unit are not shown in FIG. 10. The electrical converter device further comprises a converter unit 1053. The converter unit can be e.g. a rectifier that is arranged to transfer energy from an alternating voltage network 1054 to the intermediate circuit 1052. The converter unit can be as well a device that is capable of transferring energy, not only from the alternating voltage network 1054 to the intermediate circuit 1052, but also from the intermediate circuit back to the alternating voltage network. Also the converter unit 1053 may comprise a reactor arrangement according to an embodiment of the invention.

Figure 11:
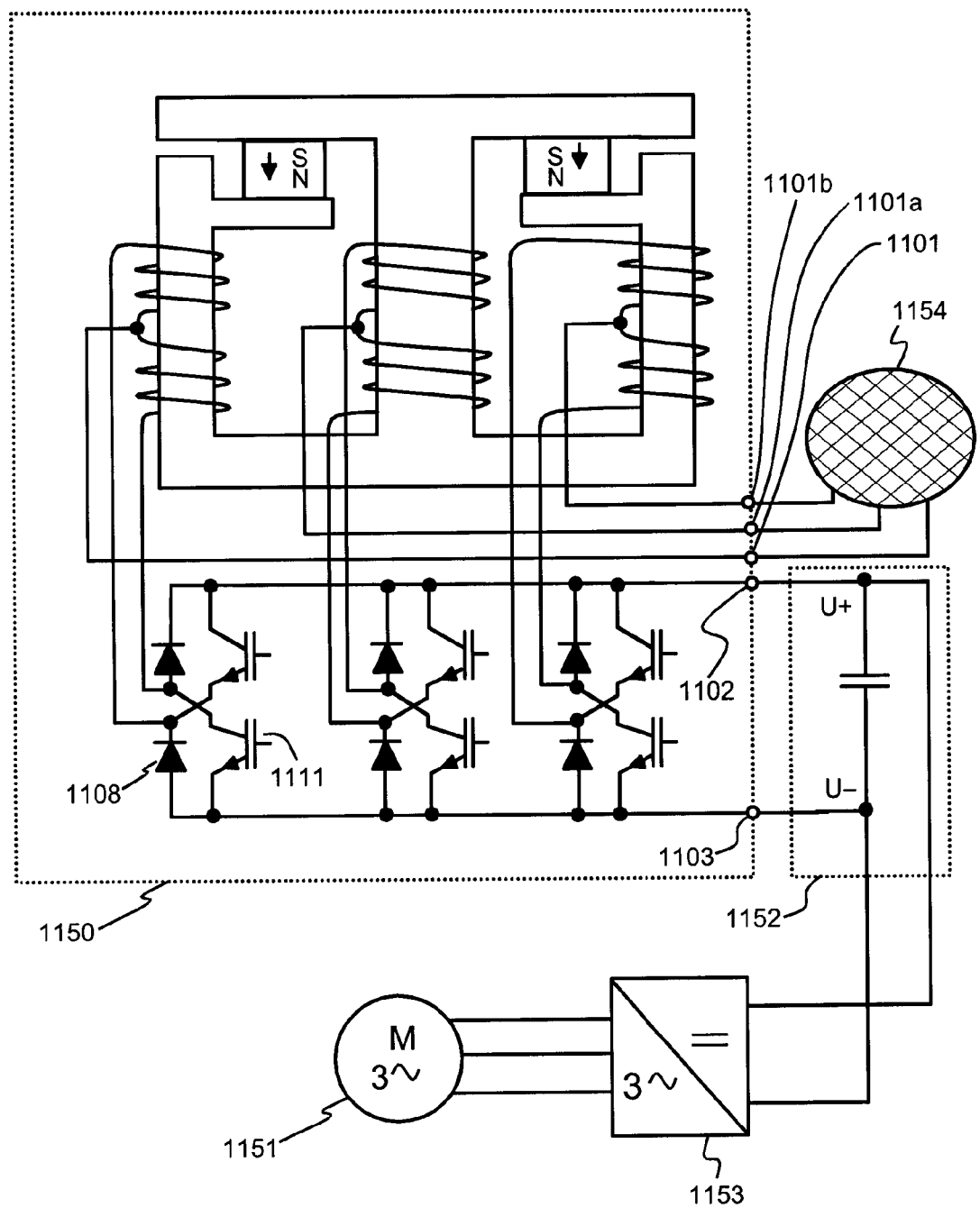
FIG. 11 shows a circuit diagram of an electrical converter device according to an embodiment of the invention.

FIG. 11 shows a circuit diagram of an electrical converter device according to an embodiment of the invention. The electrical converter device comprises a reactor arrangement 1150. Alternating voltage terminals 1101, 1101a, and 1101b of the reactor arrangement constitute terminals for connecting the electrical converter device to an alternating voltage network 1154. An intermediate circuit 1152 of the electrical converter device is coupled between a first direct voltage terminal 1102 and a second direct voltage terminal 1103 of the reactor arrangement. The reactor arrangement 1150 constitutes a main circuit of a converter unit that is able to transfer energy from the alternating voltage network 1154 to the intermediate circuit 1152 and, preferably but not necessarily, also to transfer energy from the intermediate circuit back to the alternating voltage network. The electrical converter device comprises a converter unit 1153 that is able to transfer energy from the intermediate circuit 1152 to a load 1151 and also to transfer energy from the load to the intermediate circuit. Also the converter unit 1153 may comprise a reactor arrangement according to an embodiment of the invention.

The electrical converter devices shown in FIGS. 10 and 11 are frequency converters. An electrical converter device according to an embodiment of the invention can be as well, for example, a mere inverter or a mere rectifier. In the reactor arrangements 1050 and 1150 shown in FIGS. 10 and 11, unidirectional electrical components, e.g. 1008 and 1108, are diodes and controllable electrical switches, e.g. 1011 and 1111, are insulated gate bipolar transistors (IGBT). The unidirectional electrical components can be as well thyristors, gate turn-off thyristors (GTO), field effect transistors (FET), bipolar transistors, and/or insulated gate bipolar transistors (IGBT). The controllable electrical switches can be as well thyristors (together with auxiliary circuitries for commutation), gate turn-off thyristors (GTO), field effect transistors (FET), and/or bipolar transistors.

Figure 12:
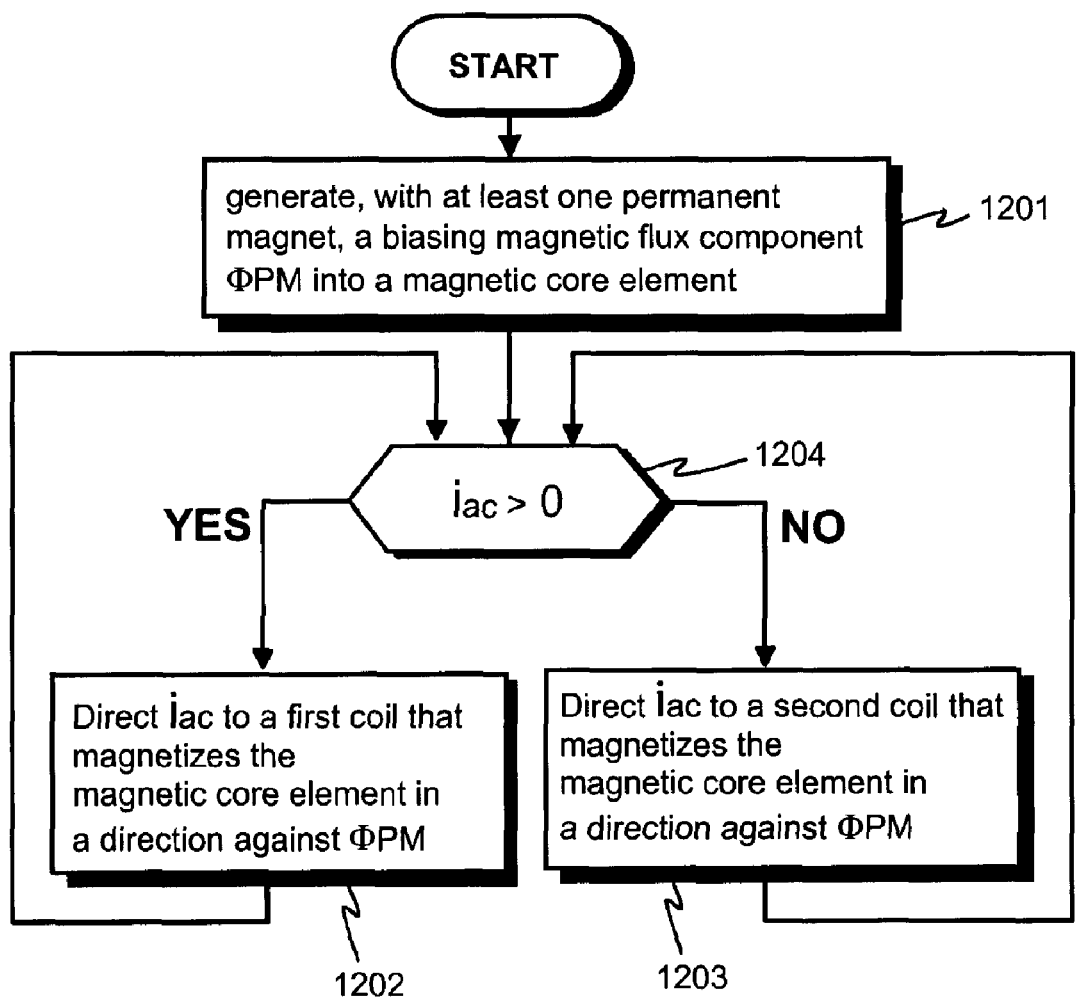
FIG. 12 is a flow chart of a method according to an embodiment of the invention for providing inductive reactance for alternating electrical current.

FIG. 12 is a flow chart of a method according to an embodiment of the invention for providing inductive reactance for alternating electrical current. A phase 1201 comprises generating, with at least one permanent magnet (e.g. 109 in FIG. 1), a biasing magnetic flux component $\Phi_{PM}$ into a magnetic core element (e.g. 104 in FIG. 1). A phase 1202 comprises directing alternating electrical current $i_{ac}$ to a first coil (e.g. 105 in FIG. 1) if the alternating electrical current is positive (a YES-branch of a selection phase 1204). The first coil is arranged to magnetize the magnetic core element in a direction opposite to the biasing magnetic flux component $\Phi_{PM}$ as a response to a situation in which the alternating electrical current is directed to the first coil. A phase 1203 comprises directing the alternating electrical current to a second coil (e.g. 107 in FIG. 1) if the alternating electrical current is negative (a NO-branch of the selection phase 1204). The second coil is arranged to magnetize the magnetic core element in the direction opposite to the biasing magnetic flux component $\Phi_{PM}$ as a response to a situation in which the alternating electrical current is directed to the second coil.

In a method according to an embodiment of the invention a first unidirectional electrical component (e.g. 106 in FIG. 1) and a second unidirectional electrical component (e.g. 108 in FIG. 1) are used for directing the alternating current to the first coil if the alternating electrical current is positive, and to the second coil, if the alternating electrical current is negative. The first unidirectional electrical component is located on an electrical current path from an alternating voltage terminal (e.g. 101 in FIG. 1) to a first direct voltage terminal (e.g. 102 in FIG. 1) and the second unidirectional electrical component is located on an electrical current path from a second direct voltage terminal (e.g. 103 in FIG. 1) to the alternating voltage terminal.

In a method according to an embodiment of the invention the first unidirectional electrical component and the second unidirectional electrical component are, respectively, one of the following: a diode, a thyristor, a gate turn-off thyristor (GTO), a field effect transistor (FET), a bipolar transistor, and an insulated gate bipolar transistor (IGBT).

In a method according to an embodiment of the invention a first controllable electrical switch (e.g. 410 in FIG. 4) is used for forming an unidirectional electrical current path from the first direct voltage terminal (e.g. 402 in FIG. 4) to an electrical node (e.g. 413 in FIG. 4) between the second unidirectional electrical component and the second coil, and a second controllable electrical switch (e.g. 411 in FIG. 4) is used for forming an unidirectional electrical current path from an electrical node (e.g. 414 in FIG. 4) between the first coil and the first unidirectional electrical component to the second direct voltage terminal (e.g. 403 in FIG. 4).

In a method according to an embodiment of the invention the first controllable electrical switch and the second controllable electrical switch are, respectively, one of the following: a thyristor, a gate turn-off thyristor (GTO), a field effect transistor (FET), a bipolar transistor, and an insulated gate bipolar transistor (IGBT).

In a method according to an embodiment of the invention the magnetic core element (e.g. 704 in FIG. 7a) is used for forming, in addition to a magnetic flux path (e.g. 715 in FIG. 7a) between a north pole of the permanent magnet and a south pole of the permanent magnet, a first additional magnetic flux path (e.g. 716 in FIG. 7a) arranged to by-pass the permanent magnet via a first magnetic-gap (e.g. 713 in FIG. 7a) and a second additional magnetic flux path (e.g. 717 in FIG. 7a) arranged to by-pass the permanent magnet via a second magnetic-gap (e.g. 712 in FIG. 7a), a part (e.g. 718 in FIG. 7a) of the magnetic core element abutting to the north pole of the permanent magnet belonging to the first additional magnetic flux path and a part (e.g. 714 in FIG. 7a) of the magnetic core element abutting to the south pole of the permanent magnet belonging to the second additional magnetic flux path.

In a method according to an embodiment of the invention there are at least two alternating electrical currents that can be e.g. phase currents of a multiphase application. Each alternating electrical current is associated with a separate set of two coils, and each alternating electrical current is directed to one of the corresponding two coils according to the polarity (positive/negative) of that alternating electrical current. Each coil is arranged to magnetize a common magnetic core element (e.g. 304 in FIG. 3) in a direction opposite to a biasing magnetic flux component that is generated with a permanent magnet (e.g. 309 in FIG. 3) into the common magnetic core element.

In a method according to an embodiment of the invention there are at least two alternating electrical currents that can be e.g. phase currents of a multiphase application. Each alternating electrical current is associated with a separate set of two coils, and each alternating electrical current is directed to one of the corresponding two coils according to the polarity (positive/negative) of that alternating electrical current. There is a separate magnetic core element (e.g. 204 in FIG. 2) and a separate permanent magnet (e.g. 209 in FIG. 2) for each alternating current. Coils (e.g. 205, 207 in FIG. 2) associated with each of the alternating currents are arranged to magnetize a corresponding magnetic core element (e.g. 204 in FIG. 2) in a direction opposite to a biasing magnetic flux component that is generated with a corresponding permanent magnet (e.g. 209 in FIG. 2) into the corresponding magnetic core element.

While there have been shown and described and pointed out fundamental novel features of the invention as applied to embodiments thereof, it will be understood that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above.

What is claimed is:

1. A reactor arrangement for providing inductive reactance for alternating electrical current, the reactor arrangement comprising:
   an alternating voltage terminal for receiving the alternating electrical current for which the inductive reactance is to be provided,
   a first direct voltage terminal,
   a second direct voltage terminal,
   a magnetic core element made of magnetically amplifying material,
   a first unidirectional electrical component on a first electrical current path from the alternating voltage terminal to the first direct voltage terminal,
   a second unidirectional electrical component on a second electrical current path from the second direct voltage terminal to the alternating voltage terminal,
   at least one permanent magnet arranged to generate a biasing magnetic flux component into the magnetic core element,
   a first coil on the first electrical current path, and
   a second coil on the second electrical current path,
   wherein, so as to provide the inductive reactance for the alternating electrical current, the first unidirectional electrical component and the second unidirectional electrical component are arranged to direct the alternating electrical current to the first coil as a response to a situation in which the alternating electrical current is positive and to the second coil as a response to a situation in which the alternating electrical current is negative, the first coil is arranged to magnetize the magnetic core element in a direction opposite to the biasing magnetic flux component as a response to a situation in which the alternating electrical current is directed to the first coil, and the second coil is arranged to magnetize the magnetic core element in the direction opposite to the biasing magnetic flux component as a response to a situation in which the alternating electrical current is directed to the second coil, and the biasing magnetic flux component generated with the at least one permanent magnet relieves magnetic saturation of the magnetic core element.

2. A reactor arrangement according to claim 1, wherein the reactor arrangement comprises at least one other alternating voltage terminal and each of the at least one other alternating voltage terminal is coupled to the first direct voltage terminal and to the second direct voltage terminal via unidirectional electrical components and via coils in the same way as the alternating voltage terminal is connected to the first direct voltage terminal and to the second direct voltage terminal via the first unidirectional electrical component, the second unidirectional electronic component, the first coil, and the second coil.

3. A reactor arrangement according to claim 2, wherein each of the coils associated with the at least one other alternating voltage terminal is arranged to magnetize the magnetic core element in the direction opposite to the biasing magnetic flux component.

4. A reactor arrangement according to claim 2, wherein the reactor arrangement comprises, for each of the at least one other alternating voltage terminal, a separate magnetic core element and a separate permanent magnet, the coils associated with each of the at least one other alternating voltage terminal being arranged to magnetize a corresponding magnetic core element in a first direction, and a corresponding permanent magnet being arranged to magnetize the corresponding magnetic core element in a direction opposite to the first direction.

5. A reactor arrangement according to claim 1, wherein the first unidirectional electrical component is located between the first coil and the first direct voltage terminal and the second unidirectional electrical component is located between the second direct voltage terminal and the second coil.

6. A reactor arrangement according to claim 1, wherein the first unidirectional electrical component is located between the alternating voltage terminal and the first coil and the second unidirectional electrical component is located between the second coil and the alternating voltage terminal.

7. A reactor arrangement according to claim 5, wherein the reactor arrangement further comprises: a first controllable electrical switch arranged to form an unidirectional electrical current path from the first direct voltage terminal to an electrical node between the second unidirectional electrical component and the second coil, and a second controllable electrical switch arranged to form an unidirectional electrical current path from an electrical node between the first coil and the first unidirectional electrical component to the second direct voltage terminal.

8. A reactor arrangement according to claim 7, wherein the reactor arrangement comprises at least one other alternating voltage terminal, each of the at least one other alternating voltage terminal is coupled to the first direct voltage terminal and to the second direct voltage terminal via unidirectional electrical components, via coils, and via controllable electrical switches in the same way as the alternating voltage terminal is connected to the first direct voltage terminal and to the second direct voltage terminal via the first unidirectional electrical component, the second unidirectional electronic component, the first coil, the second coil, the first controllable electrical switch, and the second controllable electrical switch.

9. A reactor arrangement according to claim 1, wherein the magnetic core element is arranged to form, in addition to a magnetic flux path between a north pole of the permanent magnet and a south pole of the permanent magnet, a first additional magnetic flux path arranged to by-pass the permanent magnet via a first magnetic-gap and a second additional magnetic flux path arranged to by-pass the permanent magnet via a second magnetic-gap, a part of the magnetic core element abutting to the north pole of the permanent magnet belonging to the first additional magnetic flux path and a part of the magnetic core element abutting to the south pole of the permanent magnet belonging to the second additional magnetic flux path.

10. A reactor arrangement according to claim 1, wherein the first unidirectional electrical component and the second unidirectional electrical component are, respectively, one of the following: a diode, a thyristor, a gate turn-off thyristor (GTO), a field effect transistor (FET), a bipolar transistor, and an insulated gate bipolar transistor (IGBT).

11. A reactor arrangement according to claim 7, wherein the first controllable electrical switch and the second controllable electrical switch are, respectively, one of the following: a thyristor, a gate turn-off thyristor (GTO), a field effect transistor (FET), a bipolar transistor, and an insulated gate bipolar transistor (IGBT).

12. An electrical converter device comprising:
a reactor arrangement providing inductive reactance for alternating electrical current, said reactor arrangement comprising:
an alternating voltage terminal for receiving the alternating electrical current,
a first direct voltage terminal,
a second direct voltage terminal,
a magnetic core element made of magnetically amplifying material,
a first unidirectional electrical component on a first electrical current path from the alternating voltage terminal to the first direct voltage terminal,
a second unidirectional electrical component on a second electrical current path from the second direct voltage terminal to the alternating voltage terminal,
at least one permanent magnet arranged to generate a biasing magnetic flux component into the magnetic core element,
a first coil on the first electrical current path, and
a second coil on the second electrical current path, wherein the first unidirectional electrical component and the second unidirectional electrical component are arranged to direct the alternating electrical current to the first coil as a response to a situation in which the alternating electrical current is positive, and to the second coil, a response to a situation in which the alternating electrical current is negative, the first coil is arranged to magnetize the magnetic core element in a direction opposite to the biasing magnetic flux component as a response to a situation in which the alternating electrical current is directed to the first coil, and the second coil is arranged to magnetize the magnetic core element in the direction opposite to the biasing magnetic flux component as a response to a situation in which the alternating electrical current is directed to the second coil, and the biasing magnetic flux component generated with the at least one permanent magnet is capable of relieving magnetic saturation of the magnetic core element.

13. An electrical converter device according to claim 12, wherein the alternating voltage terminal of the reactor arrangement constitutes a terminal for connecting the electrical converter device to an alternating voltage network and an intermediate circuit of the electrical converter device is coupled to the first direct voltage terminal and to the second direct voltage terminal of the reactor arrangement.

14. An electrical converter device according to claim 12, wherein the alternating voltage terminal of the reactor arrangement constitutes a terminal for connecting the electrical converter device to a load and an intermediate circuit of the electrical converter device is coupled to the first direct voltage terminal and to the second direct voltage terminal of the reactor arrangement.

15. A method for providing inductive reactance for alternating electrical current, the method comprising:
generating, with at least one permanent magnet, a biasing magnetic flux component into a magnetic core element made of magnetically amplifying material,
directing the alternating electrical current for which the inductive reactance is to be provided to a first coil if the alternating electrical current is positive, the first coil being arranged to magnetize the magnetic core element in a direction opposite to the biasing magnetic flux component as a response to a situation in which the alternating electrical current is directed to the first coil, and
directing the alternating electrical current to a second coil if the alternating electrical current is negative, the second coil being arranged to magnetize the magnetic core element in the direction opposite to the biasing magnetic flux component as a response to a situation in which the alternating electrical current is directed to the second coil so as to provide the inductive reactance for the alternating electrical current, wherein the biasing magnetic flux component generated with the at least one permanent magnet relieves magnetic saturation of the magnetic core element.

16. A reactor arrangement according to claim 3, wherein the magnetic core element is arranged to form, in addition to a magnetic flux path between a north pole of the permanent magnet and a south pole of the permanent magnet, a first additional magnetic flux path arranged to by-pass the permanent magnet via a first magnetic-gap and a second additional magnetic flux path arranged to by-pass the permanent magnet via a second magnetic-gap, a part of the magnetic core element abutting to the north pole of the permanent magnet belonging to the first additional magnetic flux path and a part of the magnetic core element abutting to the south pole of the permanent magnet belonging to the second additional magnetic flux path.

17. A reactor arrangement according to claim 7, wherein the magnetic core element is arranged to form, in addition to a magnetic flux path between a north pole of the permanent magnet and a south pole of the permanent magnet, a first additional magnetic flux path arranged to by-pass the permanent magnet via a first magnetic-gap and a second additional magnetic flux path arranged to by-pass the permanent magnet via a second magnetic-gap, a part of the magnetic core element abutting to the north pole of the permanent magnet belonging to the first additional magnetic flux path and a part of the magnetic core element abutting to the south pole of the permanent magnet belonging to the second additional magnetic flux path.

18. A reactor arrangement according to claim 8, wherein the magnetic core element is arranged to form, in addition to a magnetic flux path between a north pole of the permanent magnet and a south pole of the permanent magnet, a first additional magnetic flux path arranged to by-pass the permanent magnet via a first magnetic-gap and a second additional magnetic flux path arranged to by-pass the permanent magnet via a second magnetic-gap, a part of the magnetic core element abutting to the north pole of the permanent magnet belonging to the first additional magnetic flux path and a part of the magnetic core element abutting to the south pole of the permanent magnet belonging to the second additional magnetic flux path.

* * * * *